(12) United States Patent
O'Brien et al.

(10) Patent No.: US 7,714,228 B2
(45) Date of Patent: May 11, 2010

(54) TRIM PANEL WITH WIRING HARNESS AND METHOD OF MAKING THE SAME

(75) Inventors: Timothy F. O'Brien, White Lake, MI (US); Clarence P. Lipke, Fenton, MI (US)

(73) Assignee: Intier Automotive Inc., Newmarket (CA)

( * ) Notice: Subject to any disclaimer, the term of this patent is extended or adjusted under 35 U.S.C. 154(b) by 406 days.

(21) Appl. No.: 11/816,007

(22) PCT Filed: Feb. 14, 2006

(86) PCT No.: PCT/US2006/005146
§ 371 (c)(1),
(2), (4) Date: Sep. 18, 2007

(87) PCT Pub. No.: WO2006/088853
PCT Pub. Date: Aug. 24, 2006

(65) Prior Publication Data
US 2008/0190661 A1    Aug. 14, 2008

(51) Int. Cl.
*H02G 3/04*    (2006.01)

(52) U.S. Cl. .............. 174/72 A; 174/481; 174/68.1; 174/68.3; 174/101; 174/135; 439/207; 248/68.1

(58) Field of Classification Search ............. 174/481, 174/68.1, 68.3, 72 A, 95, 100, 101, 135; 439/207, 439/210; 52/220.7; 248/68.1, 71
See application file for complete search history.

(56) References Cited

U.S. PATENT DOCUMENTS

| | | | |
|---|---|---|---|
| 4,487,997 A * | 12/1984 | Ditchfield | 174/115 |
| 4,533,784 A | 8/1985 | Olyphant, Jr. et al. | |
| 5,895,889 A | 4/1999 | Uchida et al. | |
| 6,033,745 A | 3/2000 | Yamaguchi et al. | |
| 6,444,903 B2 * | 9/2002 | Saeki et al. | 174/480 |
| 6,528,728 B1 * | 3/2003 | Shima | 174/101 |
| 6,933,440 B2 * | 8/2005 | Ichikawa et al. | 174/507 |

* cited by examiner

*Primary Examiner*—Dhiru R Patel
(74) *Attorney, Agent, or Firm*—Honigman Miller Schwartz and Cohn LLP

(57) ABSTRACT

A wiring harness for connection to a body, the wiring harness includes at least one conductor and a protective covering having an inner portion for insulating the at least one conductor and an outer portion arranged over a region of the inner portion, wherein at least a section of the outer portion is adapted to be fused to said body.

21 Claims, 3 Drawing Sheets

TRIM PANEL WITH WIRING HARNESS AND METHOD OF MAKING THE SAME

The present invention generally relates to wiring assemblies and securing a wire assembly to a vehicle trim panel.

BACKGROUND

Wiring harnesses are utilized to bundle control wires associated with vehicle systems. The wiring harness is generally secured to the inboard side of interior trim panels by adhesive tapes, hot melt glue, or clips. With conventional methods, only portions of the wiring harness are secured to the interior trim panel and at select locations. Securing the wiring harnesses by these methods may not always provide a sufficient connection because, over time, adhesive tape may lose its adhesive properties, glue may deteriorate, or clips may come loose from interior trim panels. In some instances, an unsecured wiring harness may cause audible noise problems in the interior of the vehicle. In other instances, a wiring harness may be so misplaced that it no longer functions to provide electrical connections.

SUMMARY

A wiring harness for connection to a body, the wiring harness comprising at least one conductor and a protective covering having an inner portion for insulating the at least one conductor and an outer portion arranged over a region of the inner portion, wherein at least a section of the outer portion is adapted to be fused to said body.

DETAILED DESCRIPTION

Figure 1:
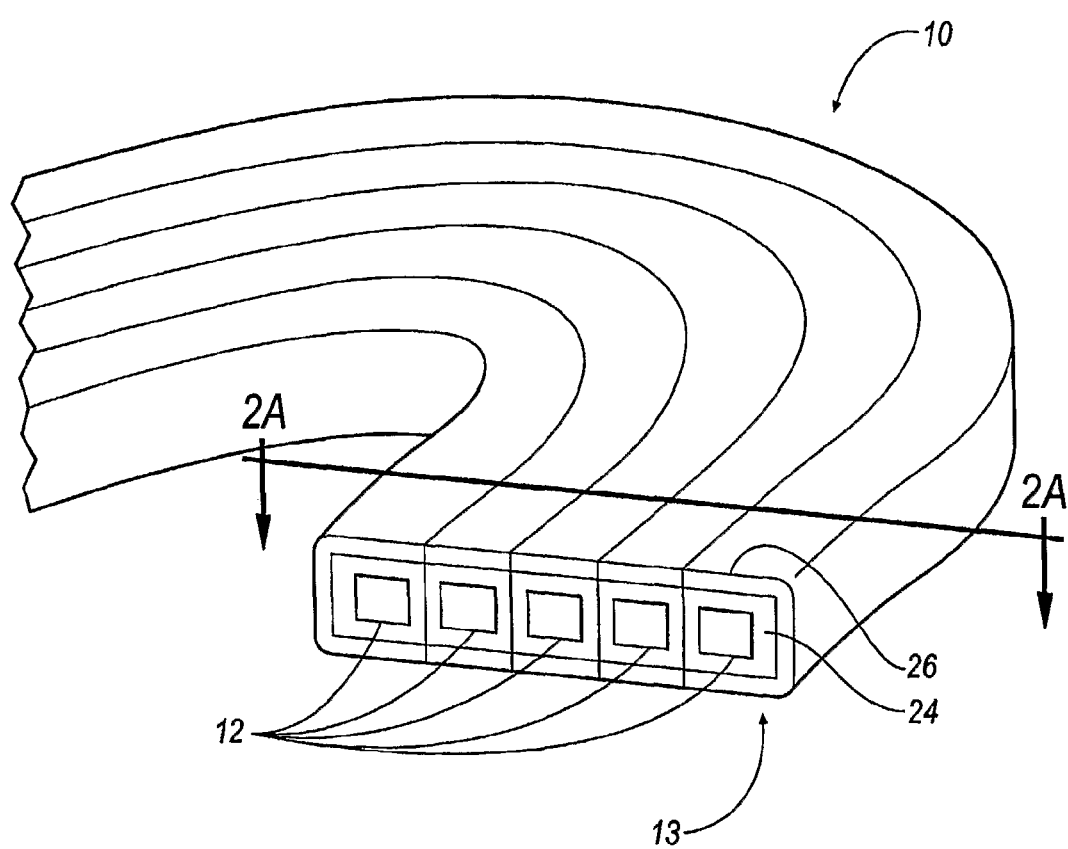
FIG. 1 is a perspective view of a wiring harness according to an embodiment.
Figure 2A:
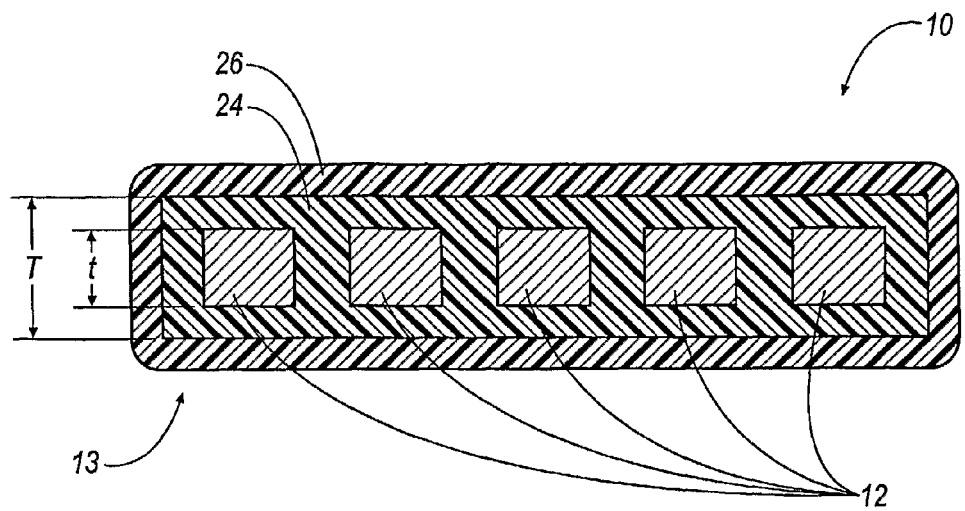
FIG. 2A is a cross-sectional view of the wiring harness shown in FIG. 1 taken along line 2-2.
Figure 2B:
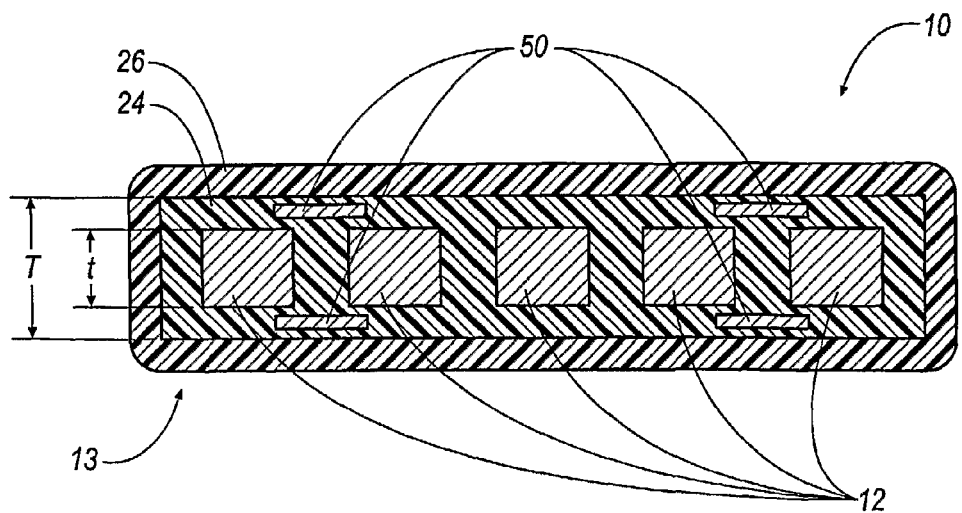
FIG. 2B is a cross-sectional view of a wiring harness according to an embodiment.

Referring to FIGS. 1-2B, a wiring harness is generally shown at 10. The illustrated wiring harness 10 is a flat ribbon wiring harness with five (5) conductors. The wiring harness 10, including the conductors 12, are formed in a longitudinally extending spaced relationship. However, it will be appreciated that the conductors 12 may be of any cross-sectional shape. Further, the number of conductors 12 shown is merely exemplary, and it is understood that any select number of conductors may be included in the wiring harness 10. Also, although each of the conductors 12 are shown having the same structures, it will be understood that variant structures (i.e., size, shape, or the like) may be substituted for one or all conductors 12, and the invention hereof should not be limited to the illustrated embodiments.

According to an embodiment, the wiring harness 10 comprises at least one conductor 12 and a covering 13. Covering 13 comprises at least an inner portion 24 and an outer portion 26. According to an embodiment, all, or at least a portion of the outer portion 26 is adapted to be fused to a body. For example, the outer portion 26 can be connected, or otherwise secured to a body, such as, for example, a substrate 30 (see, e.g., FIGS. 3 and 4). In contrast, the inner portion 24 is adapted to generally provide a generally robust insulation means for the conductor 12. For purposes of this disclosure, the term "fused" may encompass bringing a region of at least one of the body or the outer portion 26 to at least a partially melted state and associating, connecting or otherwise securing the body with the outer portion 26; and the term "at least partially melted" may encompass bringing a region of at least one of the outer portion 26 and the body to a tacky state. While a tacky state is heretofore described, it will be understood that at least a partially melted state further contemplates all melt states beyond the foregoing described tacky state.

It will be appreciated that the inner portion 24 may also partially melt; however, the inner portion 24 will still provide an insulating means for the conductor 12. For reference, inner portion 24 may be referred to as insulator 24 and outer portion 26 may be referred to as outer skin, covering or coating 26. It will be appreciated that other nomenclature may be used to identify the inner and outer portions 24, 26 and the present invention should not be limited to such descriptions. According to an embodiment, the inner and outer portions 24, 26 may be formed of a unitary structure. However, it is appreciated that the inner and outer portions 24, 26 may also comprise separate, unique structures that form separate portions. For example, insulator 24 may include a sheath, which is surrounded by an outer coating 26. The sheath may include the insulator 24, or inner portion 24, and the coating may include the outer portion 26. According to an embodiment, the inner portion 24 and the outer portion 26 may be made of a similar composite.

According to an embodiment, the conductors 12 may comprise a metal, such as, for example, aluminum, copper, gold, stainless steel, chrome, magnesium fluoride, silicon oxide or titanium. However, it will be appreciated that the conductors 12 may comprise any suitable material that may conduct a sufficient amount of electricity, including, for example, conductive polymers. As shown in an exemplary embodiment, the conductors 12 may be conventional flat ribbon conductors that have a rectangular cross-section.

The insulator 24, when viewed in cross-section along a segment, individually insulates and isolates the conductors 12 from one another and from externalities. The insulator 24 may be comprised of a thermoplastic or thermoset material, such as, for example, polyurethane, polypropylene, or polyethylene. It can be appreciated that the insulator 24 may be any plastic or other material, so long as the insulator provides an adequate thermal and nonconductive barrier between adjacent conductors 12, and between the external environment. Insulator 24 has a melting temperature and, among other reasons, including those further describe below, insulator 24 may be selected based upon this melting temperature.

According to an embodiment, outer coating 26 substantially envelops a perimeter of the insulator 24. The outer coating 26 may also be comprised of a thermoplastic or a thermoset material. Like the insulator 29, the outer coating 26 has a melting temperature. According to an embodiment, the outer coating 26 may also be selected based upon its melting temperature. For reasons discussed hereinbelow, the melting temperature of the outer coating 26 (or a portion thereof) may be selected to have a lower melting temperature than the melting temperature of the insulator 24. However, upon considering the present disclosure, it will be appreciated that the choice of melting properties of the insulator 24 and the outer coating 26 may be application specific. For example, heat may be externally supplied to the outer coating 26 and/or the substrate 30 in a fashion that brings at least a portion of one of the outer coating 26 and the substrate 30 to least a partially melted state, but is controlled such that the temperature of the insulator 24 does not rise beyond its melting point. In this manner, therefore, the melting point of insulator 24 may be approximately equal to, or even less than, the melting point of one of the outer coating 26 and the substrate 30. It will be appreciated that the entire outer coating 26, or a section of the outer coating 26, may be adapted to wholly melt, or, at least partially melt, and that the present invention should not be limited by this distinction. For purposes of convenience, the disclosure will refer to outer coating 26 and it is to be understood that the reference thereto in the general sense should encompass both forms, i.e., the entire outer coating and a section thereof.

Upon considering the present disclosure, it is also conceived that at least a section of the substrate 30 may at least partially melt to fuse the outer portion 26 to the substrate 30. According to an embodiment, a fusing of the substrate 30 to the wiring harness 10 may be accomplished by bringing at least a section of the substrate 30 to at least a partially melted state and securing the wiring harness 10 thereto; in this example, the outer portion 26 may or may not be in a partially melt state for fusing to the substrate 30.

Figure 3:
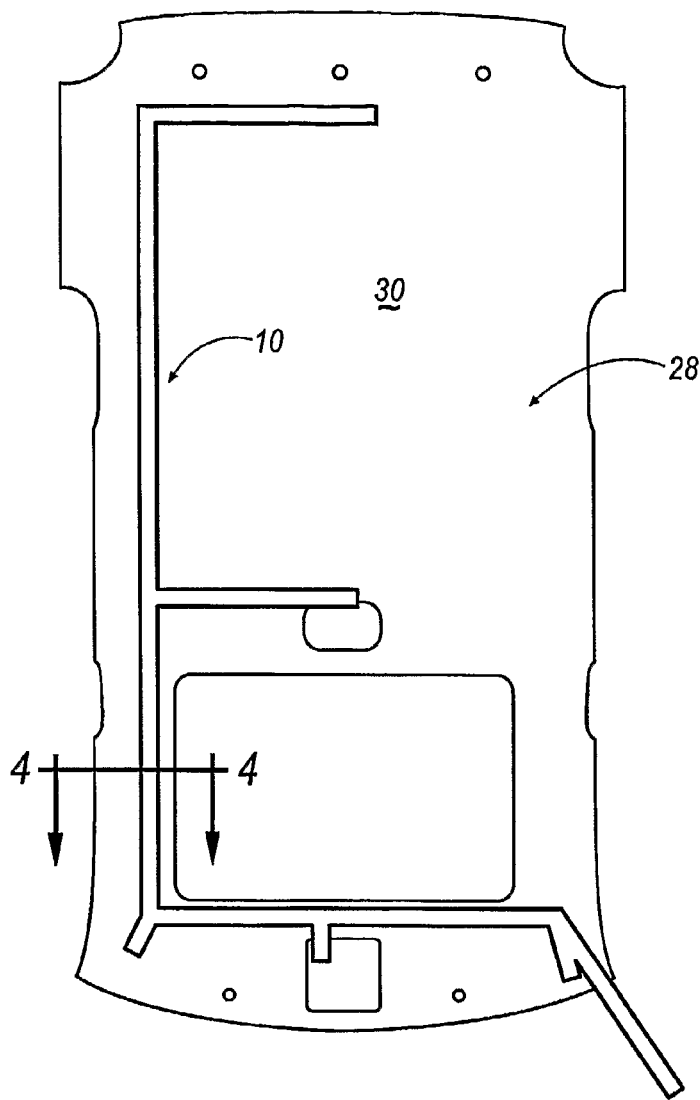
FIG. 3 is a plan view of a wiring harness shown secured to a headliner according to an embodiment.

With general reference to FIG. 3, in accordance with the invention, the wiring harness 10 may be fused to a vehicle trim panel 28. According to an exemplary embodiment, the vehicle trim panel 28 comprises a headliner having a substrate 30 and a covering 32. While a headliner is shown and described, upon considering this disclosure, one of ordinary skill can apply the principles described herein to deploy the wiring harness 10 across a broad range of packaging environments.

According to an embodiment, the headliner 28 may have a datum point, marking, or the like (not shown) on the inboard "B" surface of the substrate 30 to assist in locating and/or routing the wiring harness 10. The markings may include embossed or molded-in location marks on the "B" surface. Alternatively, the "B" surface of the headliner 28 may include a mold-in groove along the route of the wiring harness 10. After considering the foregoing examples, it can be appreciated that any means for locating the routing of the wiring harness 10 can be provided on the headliner 28. Additionally, the wiring harness 10 may be temporarily secured to the headliner 28 by tape or clamps (not shown). Temporarily securing the wiring harness 10 may be particularly useful if the wiring harness 10 includes several conductors and is relatively thick.

According to an embodiment, at least a portion of outer coating 26 is adapted to fuse wiring harness 10 to at least a portion of the substrate 30. This may be accomplished by applying heat that is sufficient to at least partially melt outer coating 26, but also sufficient to allow the insulator 24 to retain its insulative properties. As described, substrate 30 may be alternatively, or also, adapted to at least partially melt to accomplish the fuse of the outer coating 26 to the substrate. For example, a substrate material may be provided that is adapted to at least partially melt upon the application of heat thereto, or partially melt when heat is applied to the combination of the outer coating 26 and the substrate 30.

According to an embodiment, heat may be provided externally by a heat chamber, such as, for example, an infrared heat chamber. The heat from the infrared heat chamber at least partially melts the outer coating 26 of the wiring harness 10. The heat is supplied at a temperature sufficient to at least partially melt at least one of the outer coating 26 of the wiring harness 10 and the substrate 30, but not high enough to materially melt the insulator 24, thereby allowing insulator 24 to retain its insulating structure and operational (or functional) integrity. In other words, as at least one of the outer coating 26 and the substrate 30 at least partially melts, at least a portion of the outer coating 26 becomes fused to the substrate 30, (e.g., a headliner 28).

An exemplary arrangement to ensure that at least one of the outer coating 26 and the substrate 30 at least partially melts while insulator 24 generally retains its insulative properties during a heat application is via a novel choice of the melting temperatures of insulator 24, outer coating 26 and substrate 30.

As previously described, the outer coating 26 and/or substrate 30 may be selected to have a lower melt temperature than a melt temperature of the insulator 24. Thus, upon the application of heat at or above the melting point of one of the outer coating 26 and the substrate 30; but below the melting point of the insulator 24, the corresponding one of the outer coating 26 and the substrate 30 at least partially melt and insulator 24 generally maintains its insulative properties. In an embodiment, when the one of the outer coating 26 and the substrate 30 has a lower melting temperature than the insulator 24, heat supplied from the heat chamber at a temperature at or around the lower melting temperature of one of the outer coating 26 and the substrate 30; but below the melting temperature of the insulator 24 will not materially affect the insulative properties of the insulator 24. Once the headliner 28 and the wiring harness 10 are sufficiently cooled, the wiring harness 10 is positively secured to the headliner 28. According to an embodiment, the wiring harness 10 may be secured to the headliner substantially along the length of the wiring harness 10, thereby providing a stronger and more uniform bond between the wiring harness 10 and the headliner 28 than conventional methods.

Moreover, in lieu of, or, in addition to the foregoing examples, heat may be provided to one of, or, both of the outer coating 26 and at least a section of the substrate 30 from a position internal to the wiring harness 10. That is, according to an embodiment, heat may be generated from an electric current passed through the conductors 12 and through the medium comprising the insulator 24 to melt one of, or both of, the outer coating 26 and at least a section of the substrate 30. The heat may thereafter be transmitted to one of, or both of, the outer coating 26 and a section of the substrate 30 via the insulator 24. In this embodiment, the resistance associated with conductors 12 may be advantageously used to generate the requisite heat as electric current is passed through conductor 12. The heat generated from resistance to the electrical current passes by conduction through the conductors 12 to the outer coating 26, to at least partially melt one of or both of the outer coating 26 and the substrate 30. Once cooled, the wiring harness 10 is positively secured to the headliner 28.

According to an embodiment, the insulator 24 may substantially surround the conductors 12, as shown in the Figures, to provide generally equal insulation on all sides of the conductors 12. Alternatively, the insulator 24 may vary in thickness, for example, being relatively thicker in areas that necessitate greater insulation and relatively thinner in areas that do not demand as much insulation. The thickness of insulator 24 may be chosen to direct heat into particular areas of outer coating 26. For example, the sheath thickness may be advantageously configured to at least partially encourage the melting of certain portions of the outer coating 26. Referring to FIGS. 2A and 2B, according to an embodiment, the total thickness, T, of the insulator 24 is not more than twice the thickness, t, of the individual conductors 12.

Similarly, the outer coating 26 may have a uniform thickness, or the outer coating 26 may have a variable thickness around the insulator 24. For example, it may be desirable to have the outer coating 26 slightly thicker along certain portions of the insulator 24 and slightly thinner along other portions of the insulator 24. According to another example, the outer coating 26 may be provided along only a portion of the insulator 24. The choice of thickness of both the insulator 24 and the outer coating can be application specific, and, upon considering this disclosure, one of ordinary skill in the art will readily decipher the appropriate thicknesses. Moreover, the outer coating 26 may be provided to generally conform to the surface of the substrate 30 before heat is applied thereto.

Referring now to FIG. 2B, the wiring harness 10 may include additional conductors 50 that act as "dummy" conductors. An electric current may be passed through one or more of such "dummy" conductors 50 to generate all, or, a portion of the heat for fusing the wiring harness 10 to the headliner 28, as previously described. The "dummy" conductors 50 may, for example, be placed on each end of the wiring harness 10, or interspersed among the conductors 12. FIG. 2B illustrates four (4) "dummy" conductors 50 provided at positions around a perimeter of the insulator 24 and more proximate to the outer coating 26 than the conductors 12. It will be appreciated that one or more "dummy" conductors 50 may be provided at any position and the present invention should not be limited to the position thereof. For example, one or more "dumnmy" conductors may be provided between insulator 24 and outer coating 25. It will also be appreciated that this use of "dummy" conductors 50 can preserve the remaining conductors 12 from potential damage that might otherwise occur from enlisting same in the resistance welding process.

While the invention is directed towards securing the wiring harness 10 to the headliner 28, it can be appreciated that the invention can be practiced on any interior trim piece, such as, for example, a door trim panel, an instrument panel, the package tray, or the like. Additionally, the invention can be practiced on any metal piece, such as the metal shell of the vehicle. Further, it can be appreciated that the invention can be practiced with any type or shape of wiring harness so long as at least a portion of the outer coating has a sufficiently lower melt temperature than the insulation sheath of the wiring harness 10.

Figure 4:
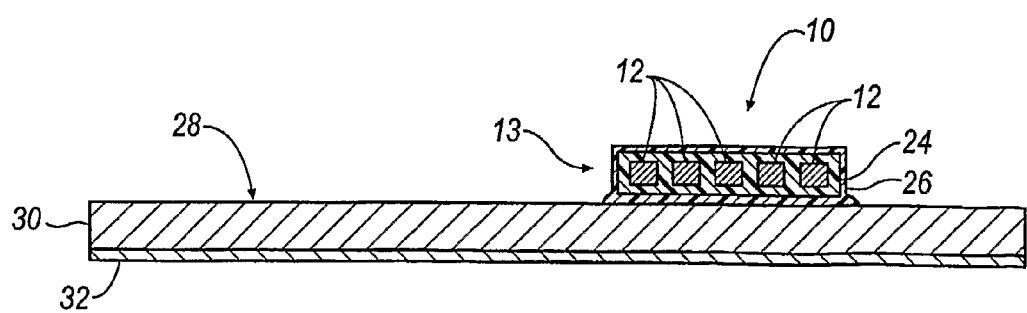
FIG. 4 is a cross-sectional view of the wiring harness shown in FIG. 3 taken along line 4-4.

FIG. 4 illustrates an embodiment of the invention wherein a portion of the outer coating 26 is fused to a surface of a substrate 30. According to an embodiment, as heat is applied to at least a portion of the outer coating 26, a portion of the outer coating 26 is adapted to generally conform to the surface of the substrate 30. It may be desired to localize or otherwise direct the heat about a particular region of outer coating 26 such that only a region to be fused to substrate 30 becomes at least partially melted and the remaining portion of outer coating 26 retains its structural integrity, similar to insulator 24. According to an embodiment, this can be achieved by arranging the insulator 24 to have a first thickness about a first region of the conductor 12 and a second thickness about a second region of the conductor 12. The first thickness being defined to fuse the outer coating 26 to the substrate 30 and the second region adapted to allow the outer coating 26 to retain its structural integrity. Specifically, the first thickness may be greater than the second thickness such that a first area of the outer portion 26 proximate to the second thickness of the inner portion 24 is adapted to at least partially melt to fuse the first area to the substrate 30, while a outer portion 26 proximate to the first thickness of the inner portion 24 does not melt due to the increased thickness of the insulator which can be used to dissipate the heat.

The wiring harness 10 may be manufactured through any conventional methods. In an exemplary embodiment, the illustrated wiring harness 10 may be manufactured, for example, by a co-extrusion process. During a co-extrusion process, each of the different materials comprising the various components of the wiring harness 10 may be melted and forced to flow through a die opening in an extrusion die (not shown). The extruded materials emerge from the co-extrusion die as an elongated piece (not shown) with the same profile as the die opening. In the exemplary embodiment, the shape of the die opening corresponds to the cross-sectional shape of the wiring harness 10. The elongated piece is then cut to any desired length, forming a wiring harness in accordance with an embodiment of the invention. While a co-extrusion process is described, it can be appreciated that the wiring harness 10 may be manufactured using a variety of manufacturing process and the invention should not be limited to the foregoing processes described.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A wiring harness for connection to a substrate, the wiring harness comprising: at least one conductor; and a protective covering having an inner portion for insulating the at least one conductor and an outer portion arranged over at least a region of the inner portion, wherein the inner portion has a first thickness about a first region of the conductor and a second thickness about a second region of the conductor, wherein the first thickness is greater than the second thickness such that a first area of the outer portion proximate to the second thickness of the inner portion is adapted to fuse a first area to the substrate, while a second area of the outer portion proximate to the first thickness of the inner portion retains insulative properties, and wherein at least a section of the outer portion is adapted to be fused to said substrate by externally supplying heat to the at least a section of the outer portion and the substrate.

2. The wiring harness according to claim 1, wherein the inner portion is adapted to generally retain a solid state when the at least a section of the outer portion is at or around its melting temperature.

3. The wiring harness according to claim 2, wherein the melting temperature of the at least a section of the outer portion is lower than a melting temperature of the inner portion.

4. The wiring harness according to claim 1, wherein the inner portion is an insulating sheath and the outer portion comprises one or both of a thermoplastic and a thermoset.

5. The wiring harness according to claim 1, wherein said substrate is adapted to fusably receive the at least a section of the outer portion of the wiring harness, when one or both of the substrate and the at least a section of the outer portion at least partially melt.

6. The wiring harness according to claim 5, wherein the substrate is selected from the group consisting of a vehicle headliner, a door trim, an instrument panel, and a package tray.

7. The wiring harness according to claim 1, wherein said substrate includes at least one marking to assist in a positioning of the wiring harness.

8. The wiring harness according to claim 1, further including at least one dummy conductor disposed within one of or both of the inner portion and the outer portion, the dummy conductor adapted to receive an electric current to introduce heat to the outer portion.

9. The wiring harness according to claim 8, wherein at least a portion of the at least one dummy conductor is disposed between an insulating sheath and an outer coating.

10. The wiring harness according to claim 8, wherein the at least a section of the outer portion has a lower melting temperature than a melting temperature of the inner portion.

11. The wiring harness according to claim 1, wherein the first thickness of the inner portion equals or is less than twice a thickness of one of the conductors.

12. The wiring harness according to claim 1, wherein the at least a section of the outer portion defines a connection region that generally conforms to a surface of said substrate when in an at least partially melted state.

13. The wiring harness according to claim 1, wherein the outer portion has a substantially uniform thickness surrounding the inner portion.

14. The wiring harness according to claim 1, wherein the inner portion and the outer portion are integral.

15. The wiring harness according to claim 1, wherein the inner portion and the outer portion comprise the same material.

16. The wiring harness according to claim 1, wherein the substrate has a melting temperature lower than a melting temperature of the inner portion and the outer portion.

17. A method of connecting or securing a wiring harness to a substrate comprising: providing at least one conductor and a protective covering having an inner portion for insulating the at least one conductor and an outer portion arranged over a region of the inner portion, wherein the inner portion has a first thickness about a first region of the conductor and a second thickness about a second region of the conductor, wherein the first thickness is greater than the second thickness such that a first area of the outer portion proximate to the second thickness of the inner portion is adapted to fuse the first area to the substrate, while a second area of the outer portion proximate to the first thickness of the inner portion retains insulative properties; and fusing at least the first area of the outer portion to said substrate.

18. The method according to claim 17, wherein fusing includes at least partially melting one of or both of the at least first area of the outer portion and a portion the substrate.

19. The method according to claim 17, wherein fusing includes externally introducing heat to one of or both of the outer portion and the substrate.

20. The method according to claim 17, wherein fusing includes passing an electric current through the conductor to at least partially melt one of or both of the at least first area of the outer portion and the substrate.

21. The method according to claim 17, wherein the wiring harness includes at least one dummy conductor disposed within one or both of the outer portion and the inner portion, wherein fusing further comprises:
  passing an electric current through the dummy conductor to at least partially melt one of or both of the at least first area of the outer portion and the substrate.

* * * * *